# 3,048,550
VISCOUS SOLUTIONS COMPRISING SULFONATED ALKENYL AROMATIC RESINS AND GALACTOMANNAN GUM

Harold H. Roth, Bay City, Mich., assignor to The Dow Chemical Company, Midland, Mich., a corporation of Delaware
No Drawing. Filed Aug. 15, 1960, Ser. No. 49,419
7 Claims. (Cl. 260—17.4)

This invention relates to aqueous solutions comprising water-soluble, sulfonated alkenyl aromatic resins, and more particularly to said aqueous solutions thickened with polysaccharide, galactomannan gums described by Dr. Ray L. Whistler in the collection of papers entitled "Natural Plant Hydrocolloids," Number 11 of the Advances in Chemistry Series, American Chemical Society, 1954, pages 45–49 inclusive.

Various water-soluble, sulfonated alkenyl aromatic resins have been used in the past to produce viscous aqueous solutions; however, I have discovered that polysaccharide, galactomannan gums, generally considered to consist of a linear chain of D-mannose units (certain of which bear D-galacton units) linked together by glyosidic linkages, greatly increases the viscosity characteristic of such aqueous solutions in a synergistic manner. Illustrative of such galactomannan gums are guar gum, locust bean gum and other endosperm seeds from the Leguminosae plant family.

The water-soluble, sulfonated alkenyl aromatic resins, envisioned herein are preparable by a number of known processes, but are usually obtained by the nuclear sulfonation of solid polymers and copolymers of monoalkenyl aromatic hydrocarbons having the formula:

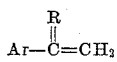

wherein Ar represents an aryl radical and R represents hydrogen or a methyl radical. Examples of such alkenyl aromatic resins are polystyrene, solid polymers of vinyltoluene, vinylxylene, ar-ethylstyrene, alpha-methylstyrene, or ar-methyl-alpha-methylstyrene, etc., and solid copolymers of such alkenyl aromatic compounds with one another, e.g., copolymers of styrene and alpha-methylstyrene, or of styrene and vinyltoluene, etc.

In carrying out the present invention, a polysaccharide galactomannan gum and a water-soluble sulfonated alkenyl aromatic resin may be dissolved in water, or aqueous solutions thereof may be intermixed to produce an immediate synergistic increase in viscosity not expected from the several viscous properties of said gums or resins. Synergism appears to be present when any proportion of gum to resin is employed; however, superior synergistic action is obtained when the relative ratio of gum to resin, by weight, is between about 5:1 and about 1:1. Thickened aqueous solutions, made according to the method described herein, are useful as media for other ingredients such as are conventionally employed in the production of various pharmaceutical or cosmetic preparation, e.g., salves, ointments, etc.

Illustrative of the synergistic results obtained from polysaccharide galactomannan gums and water-soluble, sulfonated alkenyl aromatic resins, an aqueous solution containing 0.4 percent by weight sulfonated polyvinyltoluene (having a molecular weight of about ten million) and an aqueous solution containing 1.4 percent by weight guar gum were subjected to viscosity determinations. The viscosities of said aqueous solutions were 310 and 1,800 centipoises respectively at 25° centigrade. Thereafter, an aqueous solution was prepared containing 0.4 percent by weight of identical grade sulfonated polyvinyl toluene and 1.0 percent by weight of identical grade guar gum; the resultant viscosity was 14,400 centipoises at 25° centigrade.

Similar results were obtained when sulfonated polyvinyl toluene was replaced by a like amount of sulfonated polystyrene.

It is readily apparent from the foregoing described results that polysaccharide galactomannan gums greatly increase the viscous nature of aqueous solutions of water-soluble, sulfonated alkenyl aromatic resins; furthermore, various modifications may be made in the present invention without departing from the spirit or scope thereof, and it is to be understood that I limit myself only as defined in the appended claims.

I claim:

1. A thickened aqueous solution comprising a synergistic mixture of water-soluble, sulfonated alkenyl aromatic resin and polysaccharide, galactomannan gum.

2. A thickened aqueous solution comprising a synergistic mixture of about one part, by weight, water-soluble, sulfonated alkenyl aromatic resin to about one part to five parts, by weight, polysaccharide, galactomannan gum.

3. A thickened aqueous solution comprising a synergistic mixture of water-soluble, sulfonated polyvinyl toluene and a polysaccharide, galactomannan gum.

4. A thickened aqueous solution comprising a synergistic mixture of water-soluble, sulfonated polystyrene and polysaccharide, galactomannan gum.

5. A thickened aqueous solution comprising a synergistic mixture of water-soluble, sulfonated alkenyl aromatic resin and guar gum.

6. A thickened aqueous solution comprising a synergistic mixture of water-soluble, sulfonated polyvinyl toluene and guar gum.

7. A thickened aqueous solution comprising a synergistic mixture of water-soluble, sulfonated polystyrene and guar gum.

References Cited in the file of this patent

UNITED STATES PATENTS

| | | |
|---|---|---|
| 2,612,485 | Baer et al. | Sept. 30, 1952 |
| 2,862,913 | Lynn et al. | Dec. 2, 1958 |
| 2,967,836 | Moffitt et al. | Jan. 10, 1961 |